United States Patent [19]
Moffett et al.

[11] Patent Number: 5,724,315
[45] Date of Patent: Mar. 3, 1998

[54] OMNIDIRECTIONAL ULTRASONIC MICROPROBE HYDROPHONE

[75] Inventors: Mark B. Moffett, Waterford; James M. Powers, Norwich, both of Conn.; Dmitry Chizhik, Highland Park, N.J.; Timothy B. Straw, New London, Conn.

[73] Assignee: The United States of America as represented by the Secretary of the Navy, Washington, D.C.

[21] Appl. No.: 655,104

[22] Filed: May 29, 1996

[51] Int. Cl.$^6$ ........................................ H04R 1/44
[52] U.S. Cl. ............................................... 367/153
[58] Field of Search ............................ 367/149, 153, 367/155, 157, 165, 173, 180; 310/337, 334

[56] References Cited

U.S. PATENT DOCUMENTS

| | | | |
|---|---|---|---|
| 4,316,115 | 2/1982 | Wilson et al. | 310/327 |
| 4,422,003 | 12/1983 | Safari et al. | 310/358 |
| 4,433,400 | 2/1984 | Dereggi et al. | 367/163 |
| 4,672,591 | 6/1987 | Breimesser et al. | 367/152 |
| 4,841,494 | 6/1989 | Banno | 367/157 |
| 5,072,426 | 12/1991 | Schafer et al. | 367/164 |
| 5,137,776 | 8/1992 | Kahn | 428/304.4 |
| 5,209,119 | 5/1993 | Polla et al. | 73/723 |
| 5,367,500 | 11/1994 | Ng | 367/157 |

*Primary Examiner*—Daniel T. Pihulic
*Attorney, Agent, or Firm*—Michael J. McGowan; Robert W. Gauthier; Prithvi C. Lall

[57] ABSTRACT

An omnidirectional ultrasonic microprobe hydrophone is disclosed. Applications include underwater mine detection, explosive shock testing, high wave number measurements, medical imaging, and therapeutic systems. The apparatus includes at least two lead zirconate titanate (PZT) pressure sensing elements having a plurality of columnar voids formed therein. The pressure sensing elements are deposited on a metallic or nonmetallic substrate which provides mechanical support for the microprobe hydrophone. Electrical connection to the pressure sensing elements is made by deposition of conductors and insulators on the substrate material. Wire bonds are used to attach wire leads for connection to a supporting structure containing a preamplifier. Line arrays and planar arrays of microprobe hydrophone elements are also disclosed.

13 Claims, 6 Drawing Sheets

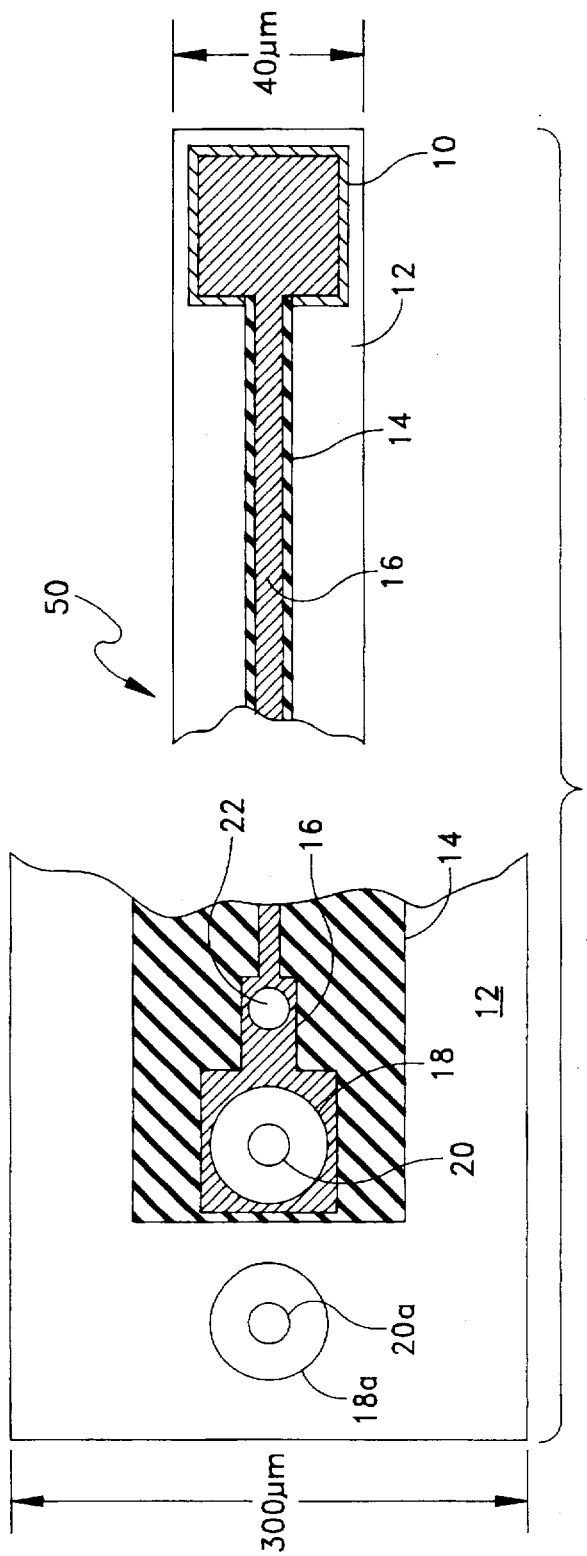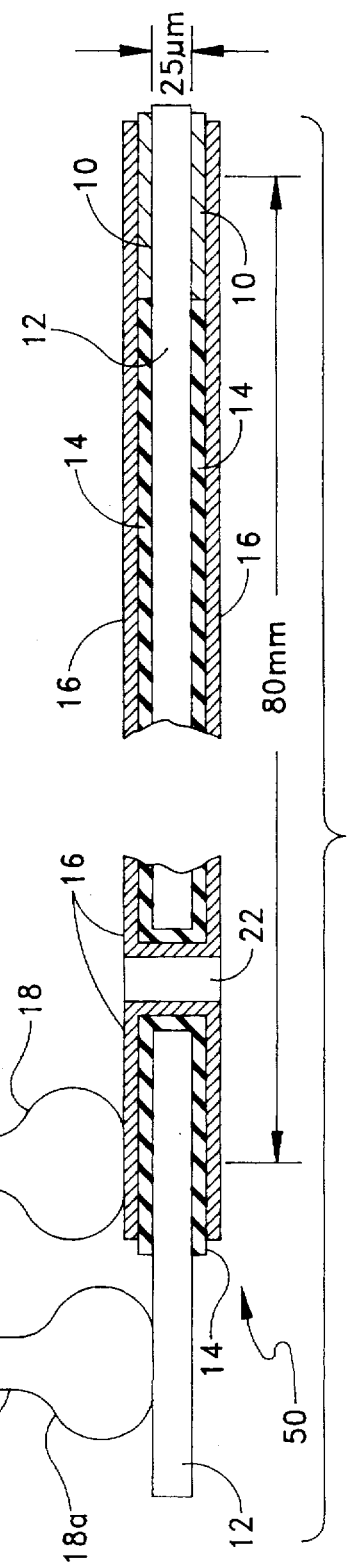
FIG. 2A
FIG. 2B

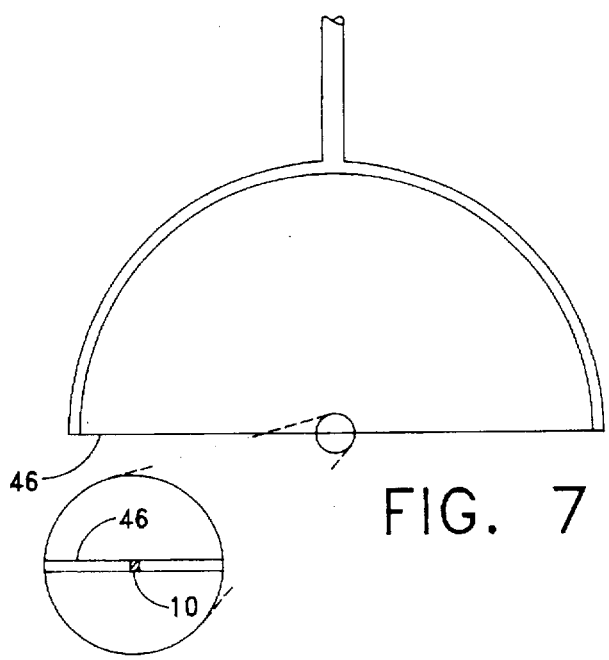
FIG. 7
FIG. 7A
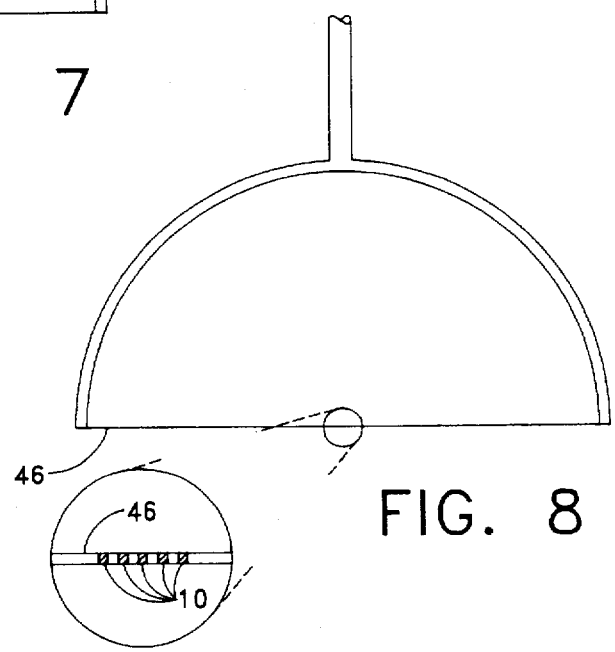
FIG. 8
FIG. 8A
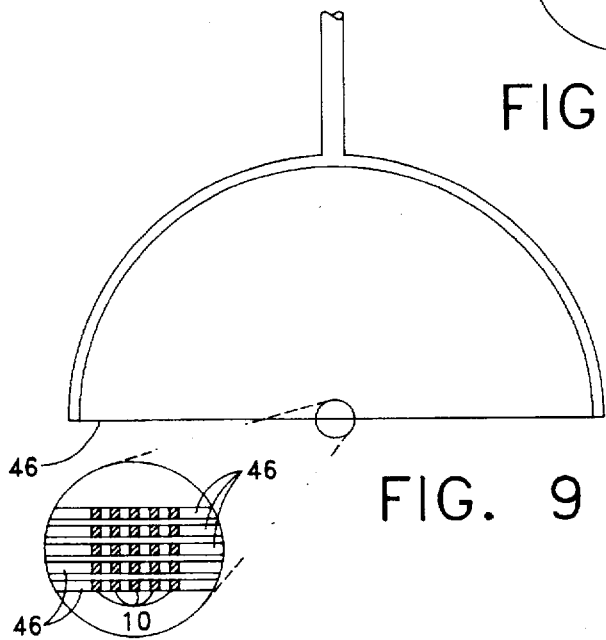
FIG. 9
FIG. 9A

OMNIDIRECTIONAL ULTRASONIC MICROPROBE HYDROPHONE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the invention

The present invention is directed to an omnidirectional ultrasonic microprobe hydrophone for medical imaging and therapeutic applications. Still further, the present invention is directed to an omnidirectional ultrasonic microprobe hydrophone for use in underwater mine detection, explosive shock testing, and high-wavenumber measurements.

(2) Description of The Prior Art

It is known to utilize thin-film polyvinylidene fluoride (PVDF) membrane hydrophones with 1mm$^2$ electrode areas to probe the fields of focused projectors, but the electrode area is too large for accurate measurements in the neighborhood of a focus. Use of a smaller electrode size is impractical because the capacitance would become too small to drive the preamplifier, which must be located at some distance from the sensing element to ensure reflection-free dosimetry measurements. The membrane probes also require frequent replacement when used to measure levels near the focus of ultrasonic lithotripsy projectors. Because they are essentially hand made, they are costly.

The traditional blast gage, made of tourmaline crystal, is used for measuring the amplitudes of explosive shock waves. The tourmaline crystal is highly directional since making it small enough for omnidirectionality would severely reduce the capacitance and sensitivity of the gage. When precisely oriented (a time-consuming process) so as to respond accurately to the sharp rise of the shock front, the gage "rings" at its resonance frequency (typically several MHz), because the shock front is rich in frequency components in the neighborhood of the resonance. Therefore, blast gages are usually placed edge-on with respect to the incoming shock wave, a procedure that limits the frequency response and rise time that can be accurately measured.

In order to measure the high-wavenumber pressure fields associated with turbulent flow, the probe size must be smaller than the reciprocal of a characteristic wavenumber of the field, i.e., smaller than the mean flow velocity divided by the frequency. End-capped lead zirconate titanate (PZT) cylinders are often used for such measurements, but they cannot be made smaller than 1 mm, limiting the maximum wavenumber to about 500 cycles/meter. The maximum frequency for such measurements is about 5 kHz for a 10 m/sec (20 Knot) flow velocity.

A number of different microprobe devices are known in the art. However, these known devices do not incorporate the omnidirectional capabilities of the inventive device and include:

U.S. Pat. No. 4,316,115 to Wilson et al. as disclosing a Polymeric Piezoelectric Microprobe With Damper; U.S. Pat. No. 4,433,400 to DeReggi et al. as disclosing an Acoustically Transparent Hydrophone Probe; U.S. Pat. No. 4,422,003 to Safari et al. as disclosing Perforated PZT Polymer Composites; U.S. Pat. No. 4,672,591 to Breimesser et al. as disclosing an Ultrasonic Transducer; U.S. Pat. No. 4,841,494 to Banno as disclosing an Underwater Piezoelectric Arrangement; U.S. Pat. No. 5,072,426 to Schafer et al. as disclosing a Self-Monitoring Shock Wave Hydrophone; U.S. Pat. No. 5,137,776 to Kahn as disclosing a Metal-Coated, Ordered Void Piezoelectric Ceramic Material; U.S. Pat. No. 5,209,119 to Polla et al. as disclosing a Microdevice for Sensing a Force; and U.S. Pat. No. 5,367,500 to Ng as disclosing a Transducer Structure.

SUMMARY OF THE INVENTION

Accordingly, it is an object of the invention to detect ultrasonic signals regardless of their direction or bandwidth up to 10 MHz.

It is still a further object of the present invention to detect pressure disturbances having wavenumbers as high as 14,000 cycles/meter.

These and other objects of the invention will be achieved by an omnidirectional ultrasonic microprobe hydrophone including a substrate member having a first surface and a second surface. A pair of pressure sensing elements is formed at the sensitive end of the microprobe with the first of the pair of pressure sensing elements formed on the first surface, and the second of the pair of pressure sensing elements formed on the second substrate surface. The pressure sensing elements consist of columnar-voided, lead zirconate titanate (PZT) deposited on the substrate. The voids are produced as a result of constrained densification during sintering at the interface between the PZT and the substrate material. The presence of the columnar voids ensures that pressure-induced lateral stresses in the sensing elements are negligible compared to the stresses perpendicular to the element surface planes, and so the resulting pressure sensitivity is much larger than if the voids were absent.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein corresponding reference characters indicate corresponding parts throughout the several views of the drawings and wherein:

FIG. 2A is a top plan schematic view of the microprobe hydrophone according to a preferred embodiment of the present invention;

FIG. 2B is a side schematic view of the microprobe hydrophone shown in FIG. 2A;

FIG. 7 and FIG. 7A illustrate a first placement of sensing elements according to either of the first or second preferred embodiments of the present invention;

FIG. 8 and FIG. 8A illustrate a line array of microprobes; and

FIG. 9 and FIG. 9A illustrate a planar array of microprobes.

DESCRIPTION OF THE PREFERRED EMBODIMENT

Figures 1, 5:
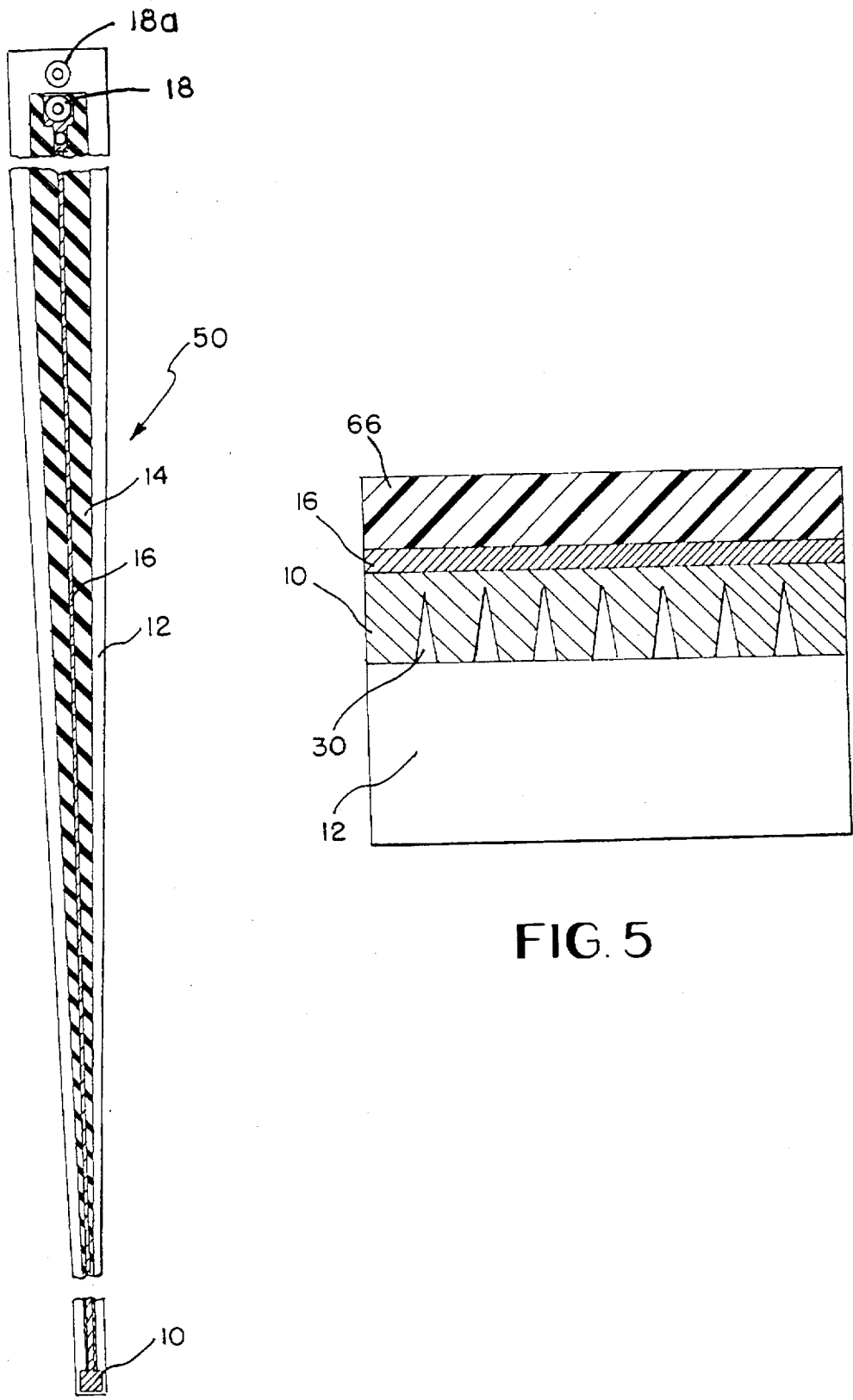
FIG. 1 is an overall illustration of the microprobe of the present invention.
FIG. 5 is an enlarged side view illustrating columnar voids formed in a sensing element of the microprobe hydrophone of FIGS. 2A and 2B.

FIG. 1 shows an overall illustration of a microprobe hydrophone 50 of the present invention. Referring also in general to FIGS. 2A and 2B, there is shown a schematic top plan view and a side view of the microprobe hydrophone 50, respectively, according to a preferred embodiment of the present invention. Two pressure sensing elements 10 are shown in FIG. 2B. Each of the pressure sensing elements 10 is composed of lead zirconate titanate (such as PZT-5H or Navy Type II-M piezoceramic material) that contains a plurality of columnar voids (illustrated more particularly in FIG. 5).

A substrate material 12 formed of a metallic conductor such as, for example, platinum foil, functions as one of the microprobe electrodes. An electrical insulating material 14, such as a dielectric silicon dioxide, separates the substrate conductor 12 from the outer electrodes 16. A first wire bond 18 is used to attach a first wire lead 20 to the outer electrodes 16. More specifically, the first wire bond 18 is used to attach the first wire lead 20 to the outer electrodes 16, which are electrically connected through a conducting member 22. A second wire bond 18a attaches a second wire lead 20a to the substrate electrode 12.

Figure 3A:
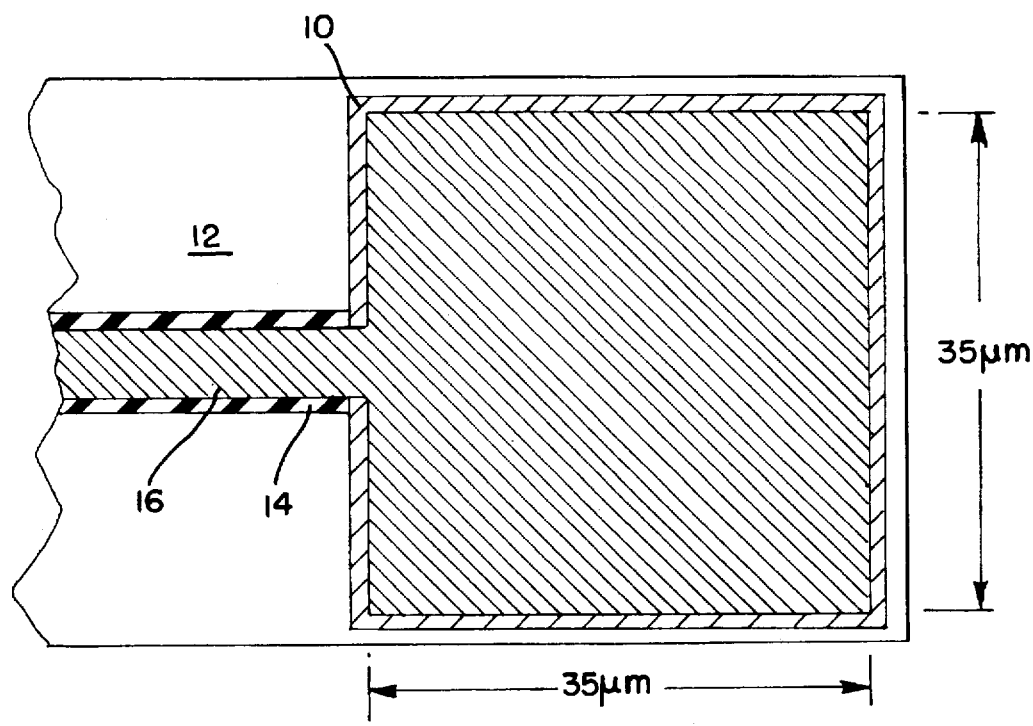
FIG. 3A is an enlarged top plan view of a pressure sensing element in the microprobe hydrophone shown in FIGS. 2A and 2B.
Figure 3B:
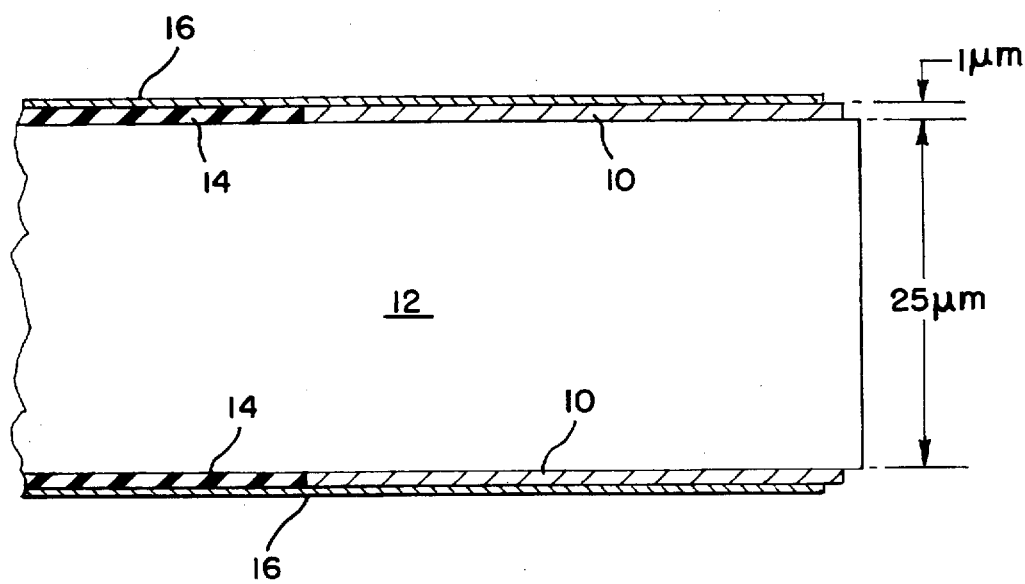
FIG. 3B is an enlarged side view of the pressure sensing element shown in FIG. 3A.

Referring now additionally to FIGS. 3A and 3B, some typical dimensions for the pressure sensing element 10 are shown. For example, the pressure sensing element 10 has an electroded area of approximately 35 µm square and a thickness of 1 µm, as shown. The thickness of the substrate material 12 is approximately 25 µm. With these dimensions and a void fraction of 10 percent, the capacitance of the pressure sensing elements 10 (connected in parallel) is about 30 pF, and the open circuit sensitivity is approximately −273 dB//1V/µPa.

With the size of the pressure sensing elements 10 at 35 µm, it can be ensured that the response will be omnidirectional within ±1 dB at 10 MHz in water. The length of the probe, shown as 80 mm in FIG. 2B, is dictated by the maximum pulse length to be received. The 80 mm microprobe length is sufficient to receive a 5 cycle tone burst at 0.1 MHz without interference from echoes due to reflections from the microprobe supporting structure. The probe 50 is tapered, as generally shown in FIG. 1, so that the support end, composed of wire bonds 18 and 18a, is wide enough for convenience in handling and to serve as a base for the wire bonds 18 and 18a. The support end of the substrate conductor 12, shown in FIGS. 2A and 2B with typical dimensions of 300 µm wide by 25 µm thick, forms a convenient gluing surface for attachment to the supporting structure and preamplifier.

Figure 4A:
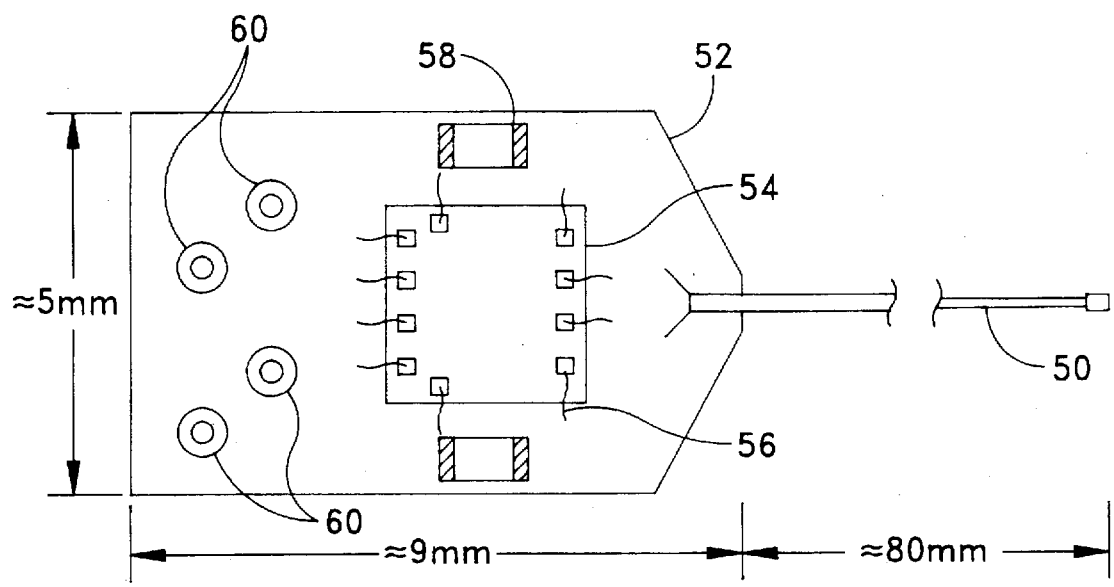
FIGS. 4A and 4B are top plan and side views, respectively, of the microprobe of the present invention packaged with a custom preamplifier.
Figure 4B:
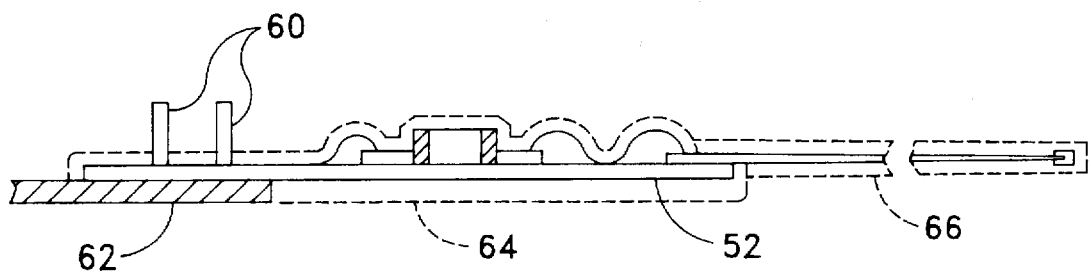

By way of example, FIGS. 4A and 4B are directed to a mounting configuration for the microprobe hydrophone, wherein the microprobe is attached to a custom preamplifier (chip-on-board version). As shown in FIG. 4A, the microprobe 50 is mounted to a printed circuit board 52, made of ceramic, epoxy or the like. The printed circuit board 52 includes at least one chip capacitor 58 mounted thereon, a preamplifier integrated circuit 54 mounted thereon and a plurality of lead wires 56 extending from the integrated circuit. The integrated circuit 54 may consist of a monolithic, low-noise preamplifier for piezoelectric sensors such as that disclosed by Straw in U.S. Pat. No. 5,339,285.

Also provided on the printed circuit board 52 is a plurality of wire connections 60. As shown in FIG. 4B, a lower surface of the printed circuit board 52 includes a mounting plate 62. A combination of the printed circuit board 52 including all elements mounted thereon as described above is encapsulated by a conformal coating 64 and the microprobe 50 is individually encapsulated by an acoustically transparent sealant 66.

The structure of the columnar voids 30 is schematically illustrated in FIG. 5. More specifically, the plurality of columnar voids 30 is produced as a result of constrained sintering at the interface between the piezoceramic material 10 and the substrate material 12. By proper choice of materials, process temperatures, and piezoceramic thickness, the columnar voids can be prevented from propagating to the outer surface of piezoceramic material 10. Subsequent deposition of the outer conductor 16 can be done on the flat, nonporous outer surface of the piezoceramic element 10.

The electrical impedance presented to the sensing elements 10 is that of a shunt capacitance and a series resistance formed by the conductors 12 and 16 and the intervening dielectric material 14. The 1 µm thickness of the sensing elements 10 ensures that the element capacitance will be larger than the shunt capacitance. The dielectric material 14 should have a small dielectric constant (preferably less than 5) so as to minimize the shunt capacitance. With typical values of 1 µm for the thickness of the dielectric material 14 and 5 µm for the width of outer conductor 16, the shunt capacitance is estimated to be about 35 pF. If the preamplifier capacitance is taken to be 15 pF, the sensitivity of the microprobe will be −273−20log(30/(30+35+15))=−282dB//1V/µPa. In other words, there is a coupling loss of 9 dB due to the nonzero shunt capacitance of the leads and the preamplifier. To ensure that the series resistance of conducting layers 16 is small compared to the reactance of the shunt capacitance, the thickness of conducting layers 16, if they are copper, must be at least 0.5 µm over the 80 mm length of the probe. Then, the high-frequency RC-rolloff in response will be less than 1 dB at 10 MHz.

For use in liquid media, such as water, and in humid or corrosive gaseous media, acoustically transparent sealant 66 is necessary to protect the microprobe. Parylene can be used, similar to the standard practice with printed circuit boards. Alternatively, the microprobe can be dipped in polyurethane or another elastomeric material as a final step in manufacture.

The presence of the plurality of columnar voids 30 within the PZT elements 10 ensures that the lateral stresses, such as those in the plane of a sensing element 10 are small compared to the stress perpendicular to the plane of the element 10. Thus, the PZT piezoceramic material operates in the so-called 3,3 mode, wherein the only nonzero stress component is in the polarization direction. The 3,3 mode is the preferred mode for PZT, with a figure of merit, FOM= sensitivity +10 log (capacitance), that is 20 dB higher than for operation in the hydrostatic mode, wherein all three stress components would be equal. The FOM is 12 dB higher than that of PVDF. In other words, the optimum (i.e., maximum obtainable) signal-to-noise ratio would be 12 dB less for an equal volume of PVDF.

Materials that are usually considered suitable for the hydrostatic mode of operation, such as lead metaniobate, tourmaline, and PVDF, all have permittivities that are a small percentage of that of PZT, and for hydrophones as small as 35 µm ×35 µm, PZT's high permittivity gives it an important advantage over hydrostatic-mode hydrophone materials. The resulting high probe capacitance allows the preamplifier to be placed remotely from the sensing elements 10, so that ultrasonic measurements free of spurious reflections from the preamplifier can be performed. This also permits the use of commercial preamplifiers that can be mounted on the supporting structure 62, without the necessity of manufacturing the preamplifier on the same substrate as the sensing elements. A number of manufacturing constraints, such as processing temperature requirements, are thereby eliminated, and the substrate material does not need to be a semiconductor. Thus, the substrate can be a metallic foil, which forms one of the electrodes of the microprobe and eliminates the need to deposit that conductor during manufacture.

The long (80 mm), thin (25 µm) substrate conductor 12 acts as an isolator for mechanical vibrations that originate in the supporting structure or mounting plate 62, such as the structural response to an incoming acoustic shock wave, because the mechanical resonance frequencies of the substrate conductor 12 lie well below the 0.1–10 MHz band of interest. On the other hand, the fundamental resonance of sensor elements 10 occurs at about 1 GHz, well above the frequency band of interest. Thus, undesired, spurious resonances within the 0.1–10 MHz band are not expected to occur.

Two symmetrically placed sensor elements 10, as shown in FIGS. 2A, 2B, 3A, and 3B form an acceleration cancelling hydrophone, because they respond oppositely to acceleration components perpendicular to the sensor elements 10 and not at all to accelerations that lie within the plane of sensor elements 10. The symmetry of sensor elements 10 also helps to ensure the omnidirectionality of the beam pattern. If only one element were used, the back side of substrate conductor 12 would act as a baffle to acoustic waves from that direction.

Commonly used ultrasonic probes are hand-built, resulting in high production costs per unit. Since the proposed device geometry is relatively simple, consisting of layers of piezoelectric material 10, metal electrodes 12 and 16, and insulating layers 14, the methods used in fabrication are similar to those for the fabrication of integrated circuits, including sol-gel casting, photolithography, and chemical vapor deposition. Economies of scale are possible, because several hundred microprobes can be constructed on each disk of substrate material 12.

It is expected that the disclosed device will be better able to withstand multiple high-level shock pulses than PVDF membrane probes, so that less frequent replacement, due to electrode delamination, will be required. Bonding a metal electrode to PVDF is difficult because of the presence of fluorine, whereas the PZT-to-metal bonds will be stronger because of more favorable chemistry.

It should be understood that the columnar voids 30 must be internal to piezoceramic sensor elements 10, and the controlled sintering process described above is the most promising and simplest method of production. However, other methods, such as photolithic/photoresist techniques, may be used to produce the voided regions. In that case, one would need to deposit thin cover layers of PZT to close the outer ends of the voids, ensuring that the newly deposited material does not fill the voids. The thin cover layers of PZT would be approximately 0.1 µm in thickness.

Another possible approach to this problem is to deposit volatile material in the spaces to be voided using material that vaporizes during the firing of the PZT, thereby forming the voids.

Figure 6A:
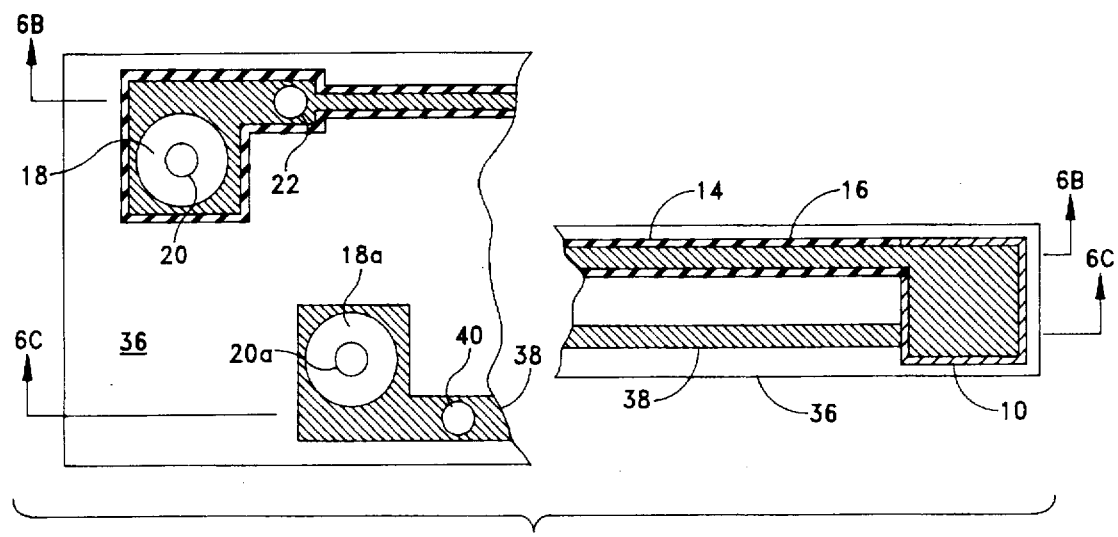
FIG. 6A is a top plan view of a microprobe hydrophone according to a second preferred embodiment of the present invention.
Figure 6B:
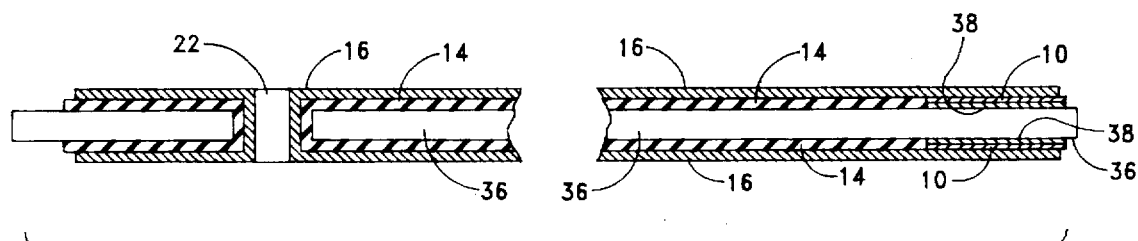
FIG. 6B is a cross-sectional view through an outer electrode of the embodiment shown in FIG. 6A.

As illustrated by the embodiment of FIG. 6A, the substrate material does not have to be an electrical conductor. Instead, a microprobe hydrophone is shown wherein the substrate material 36 is an insulator such as aluminum oxide, on which a metallic electrode 38 has been deposited. This configuration has the advantage that the shunt capacitance of the leads can be made significantly less than that of the sensing elements 10, resulting in a decrease in coupling loss, and an increase in sensitivity of about 3 dB. FIG. 6B shows a cross-sectional view through the outer electrode 16, an insulator 14 and conducting member 22, that is similar to the construction described above. The insulating layer 14 is largely unnecessary here and it serves only to maintain a flat surface for deposition of electrode 16.

Figure 6C:
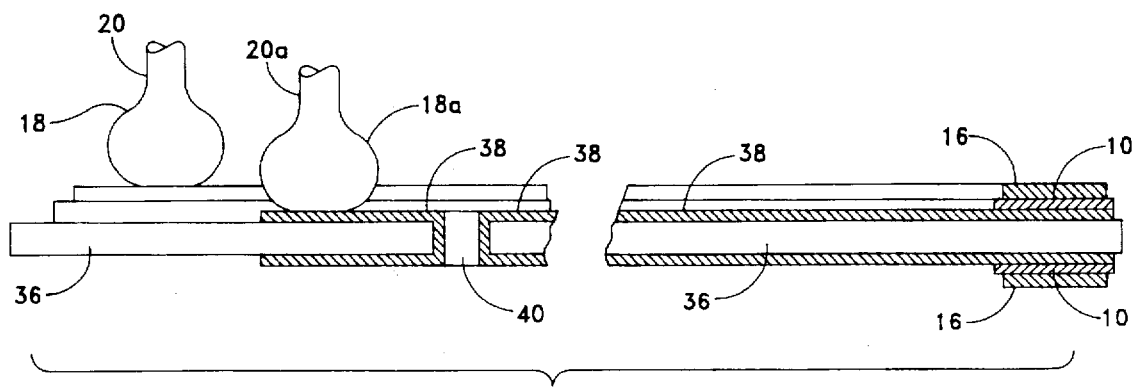
FIG. 6C is a cross-sectional view through an inner electrode of the embodiment shown in FIG. 6A.

FIG. 6C shows a cross-sectional view through the inner electrode 38 and inner conducting member 40. Also shown in FIGS. 6A and 6C are the wire bonds 18 and 18a and wire leads 20 and 20a at the support end of the microprobe.

The devices described so far entail sensing elements 10 at the small end of a substrate conductor or insulator. To provide greater control over the positioning of the microprobe, two support ends, rather than one, may be utilized. In other words, the sensing elements 10 can be placed as shown in FIG. 7 and FIG. 7A at the center of a filamentary substrate 46 that is 25 µm thick and 300 µm wide at its support ends.

Alternatively, several pairs of elements 10 could be deposited on a single substrate filament 46, forming a line array, as shown in FIG. 8 and FIG 8A. By using a matrix of such filamentary substrates 46, one can form a planar array of microprobe hydrophones, as is illustrated in FIG. 9 and FIG. 9A.

The sensing elements 10 can be wired in series to achieve a higher impedance, if desired, to match the noise impedance of the preamplifier. The microprobe can be used with various commercially available preamplifiers with various supporting structures. One alternative supporting structure could be a flat cable upon which the preamplifier and the support end (the wide end) of the microprobe are attached.

Finally, although the primary purpose of the invention is to detect ultrasonic signals regardless of their direction or bandwidth up to 10 MHz, a secondary purpose is to detect pressure disturbances having wavenumbers as high as 14,000 cycles/meter. The primary acoustic medium is assumed to be water, but the device will be useful in other fluid media as well. Because of the small size of the microprobe, it would easily fit into a catheter for use as a passive acoustic intra-arterial receiver.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An omnidirectional ultrasonic microprobe hydrophone comprising:

a substrate member having a first surface and a second surface;

a pair of pressure sensing elements formed at one end of the microprobe, the first of said pair of pressure sensing elements formed on said first surface and the second of said pair of pressure sensing elements formed on said second surface, each pressure sensing element including a plurality of columnar voids formed therein, said columnar voids providing a 3,3 mode of operation wherein lateral stresses in a plane parallel with said substrate surfaces are small when compared to the stresses perpendicular to said plane;

a pair of leads formed at an opposite end of said microprobe from said pair of pressure sensing elements; and means for electrically connecting said pair of pressure sensing elements to said pair of leads, the connecting means connecting the first of said pair of leads to a first face of each of said pressure sensing elements nearest to said substrate member and further connecting the second of said pair of leads to a second face of each of said pressure sensing elements farthest from said substrate member.

2. The microprobe according to claim 1, wherein each of said pressure sensing elements is formed of lead zirconate titanate.

3. The microprobe according to claim 1, wherein said substrate material is formed of a metallic conductor, said substrate serving as a first electrode in said means for electrically connecting said pair of pressure sensing elements to said pair of leads.

4. The microprobe according to claim 3, wherein said metallic conductor is platinum foil.

5. The microprobe according to claim 1, wherein said pressure sensing element is about 35 μm square and 1 μm in depth and said substrate is about 25 μm thick.

6. The microprobe according to claim 1, wherein said microprobe is about 80 mm in length from said pressure sensing element to said pair of leads.

7. The microprobe according to claim 1, wherein said microprobe is encapsulated with a sealant to repel moisture.

8. The microprobe according to claim 1, wherein said pair of pressure sensing elements is symmetrically positioned thereby responding oppositely to acceleration components generated perpendicular thereto.

9. The microprobe according to claim 1, wherein said substrate material is an insulator.

10. The microprobe according to claim 9, wherein said insulator material is aluminum oxide.

11. A microprobe according to claim 1, wherein said pair of pressure sensing elements are at the center of a filamentary substrate with supports at both ends.

12. A line array of microprobes according to claim 1, wherein a multiplicity of pairs of pressure sensing elements is deposited on a single substrate.

13. A planar array of microprobe hydrophones according to claim 11, wherein a multiplicity of line arrays are placed in a parallel configuration.

* * * * *